US010209515B2

(12) United States Patent
Giannuzzi et al.

(10) Patent No.: US 10,209,515 B2
(45) Date of Patent: Feb. 19, 2019

(54) FILTERING DEVICES AND FILTERING METHODS (71) Applicant: RAZER (ASIA-PACIFIC) PTE. LTD., Singapore (SG)

(72) Inventors: Joseph Mario Giannuzzi, Cedar Park, TX (US); Luca Di Fiore, New Taipei (TW)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 15/566,571

(22) PCT Filed: Apr. 15, 2015

(86) PCT No.: PCT/SG2015/050072
§ 371 (c)(1),
(2) Date: Oct. 13, 2017

(87) PCT Pub. No.: WO2016/167721
PCT Pub. Date: Oct. 20, 2016

(65) Prior Publication Data
US 2018/0088330 A1 Mar. 29, 2018

(51) Int. Cl.
G02B 27/01 (2006.01)
G06F 3/01 (2006.01)

(52) U.S. Cl.
CPC ....... G02B 27/017 (2013.01); G02B 27/0101 (2013.01); G06F 3/011 (2013.01);
(Continued)

(58) Field of Classification Search
CPC .............. G02B 27/017; G02B 27/0101; G02B 27/0118; G02B 27/012; G02B 27/0121;
(Continued)

(56) References Cited

U.S. PATENT DOCUMENTS 5,621,424 A 4/1997 Shimada et al.
5,742,264 A 4/1998 Inagaki et al.
(Continued)

FOREIGN PATENT DOCUMENTS

CN 1464974 A 12/2003
JP 06-180250 A 6/1994
(Continued)

OTHER PUBLICATIONS

Extended European Search Report dated Mar. 29, 2018, 8 pages, for the corresponding European Patent Application No. 15889335.4.
(Continued)

Primary Examiner — Tom V Sheng
(74) Attorney, Agent, or Firm — Polsinelli PC (57) ABSTRACT According to various embodiments, a filtering device may be provided. The filtering device may include: an ultraviolet light sensor configured to sense ultraviolet light; an infra-red light sensor configured to sense infra-red light; a visible light sensor configured to sense visible light; a filter selection circuit configured to select a filter based on at least two outputs selected from a list of outputs consisting of: an output of the ultraviolet light sensor; an output of the infra-red light sensor; and an output of the visible light sensor; and a filtering circuit configured to apply the selected filter.

14 Claims, 7 Drawing Sheets (52) U.S. Cl.
CPC ........ *G06F 3/017* (2013.01); *G02B 2027/014* (2013.01); *G02B 2027/0118* (2013.01); *G02B 2027/0138* (2013.01)

(58) Field of Classification Search
CPC .... G02B 2027/0118; G02B 2027/0138; G02B 2027/014; G06F 3/011; G06F 3/017; H04N 13/332; H04N 13/344
See application file for complete search history.

(56) References Cited

U.S. PATENT DOCUMENTS

| | | | |
|---|---|---|---|
| 5,841,507 A | 11/1998 | Barnes | |
| 6,163,309 A * | 12/2000 | Weinert | G01C 21/36 250/253 |
| 6,529,331 B2 | 3/2003 | Massof et al. | |
| 6,870,147 B1 * | 3/2005 | Tsukuda | G01N 17/004 250/204 |
| 8,421,015 B1 * | 4/2013 | Scott | F41G 3/147 250/338.4 |
| 8,666,212 B1 | 3/2014 | Amirparviz | |
| 8,692,845 B2 | 4/2014 | Fedorovskaya et al. | |
| 8,810,907 B2 * | 8/2014 | Haisch | A61B 5/0066 359/385 |
| 9,916,713 B1 * | 3/2018 | Yacoubian | G07D 11/0036 |
| 2002/0044152 A1 | 4/2002 | Abbott, III et al. | |
| 2004/0218187 A1 | 11/2004 | Cole | |
| 2007/0273610 A1 | 11/2007 | Baillot | |
| 2010/0039353 A1 | 2/2010 | Cernasov | |
| 2010/0295754 A1 | 11/2010 | Cernasov et al. | |
| 2011/0304472 A1 | 12/2011 | Chou et al. | |
| 2012/0050044 A1 | 3/2012 | Border et al. | |
| 2013/0088507 A1 | 4/2013 | White | |
| 2013/0214998 A1 | 8/2013 | Andes et al. | |
| 2013/0249776 A1 | 9/2013 | Olsson et al. | |
| 2013/0285885 A1 | 10/2013 | Nowatzyk et al. | |
| 2014/0002491 A1 | 1/2014 | Lamb et al. | |
| 2014/0087867 A1 | 3/2014 | Hightower | |
| 2015/0323795 A1 * | 11/2015 | Alton | G02B 27/0172 349/11 |
| 2016/0055822 A1 * | 2/2016 | Bell | G02B 27/0172 345/207 |
| 2016/0138969 A1 * | 5/2016 | Sun | G01J 1/429 250/372 |

FOREIGN PATENT DOCUMENTS

| | | |
|---|---|---|
| JP | 2000-131228 A | 5/2000 |
| JP | 2011-021906 A | 2/2011 |

OTHER PUBLICATIONS

Office Action (and English translation thereof) dated Aug. 31, 2018, in total of 11 pages, from corresponding Chinese Patent Application No. 201580080455.1.

* cited by examiner

FILTERING DEVICES AND FILTERING METHODS

TECHNICAL FIELD

Various embodiments generally relate to filtering devices and filtering methods.

BACKGROUND

For HMDs (head mounted displays), for example for those that are enabled with fully immersive Augmented Reality (AR) and Virtual Reality (VR) features, there may be a problem where by excessive/intense natural and artificial light sources from the surrounding environment may cause the content being shown on the screen to have undesired visual artifacts and high latency. For example, a person wearing an AR/VR enabled HMD may not be aware of the external light conditions as they change. When the HMD is exposed to excessive light, this may cause problems viewing the image on the HMD screen for those applications that require to blend the Virtual world with natural interaction e.g. of your own hands or other objects in the surroundings. As such, there may be a need for devices and methods to overcome these problems.

SUMMARY OF THE INVENTION

According to various embodiments, a filtering device may be provided. The filtering device may include: an ultraviolet light sensor configured to sense ultraviolet light; an infra-red light sensor configured to sense infra-red light; a visible light sensor configured to sense visible light; a filter selection circuit configured to select a filter based on at least two outputs selected from a list of outputs consisting of: an output of the ultraviolet light sensor; an output of the infra-red light sensor; and an output of the visible light sensor; and a filtering circuit configured to apply the selected filter.

According to various embodiments, a filtering method may be provided. The filtering method may include: sensing ultraviolet light; sensing infra-red light; sensing visible light; selecting a filter based on at least two sensings selected from a list of sensings consisting of: sensing the ultraviolet light; sensing the infra-red light; and sensing the visible light; and applying the selected filter.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the filtering device as described in this description may include a memory which is for example used in the processing carried out in the filtering device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

For HMDs (head mounted displays), for example for those that are enabled with fully immersive Augmented Reality (AR) and Virtual Reality (VR) features, there may be a problem where by excessive/intense natural and artificial light sources from the surrounding environment may cause the content being shown on the screen to have undesired visual artifacts and high latency. For example, a person wearing an AR/VR enabled HMD may not be aware of the external light conditions as they change. When the HMD is exposed to excessive light, this may cause problems viewing the image on the HMD screen for those applications that require to blend the Virtual world with natural interaction e.g. of your own hands or other objects in the surroundings. According to various embodiments, devices and methods may be provided to overcome these problems.

According to various embodiments, devices and methods may be provided for a dynamic approach to detect and then filter these lighting conditions.

Binocular camera systems like Leap Motion's gesture recognition device and other similar may have unique cameras that may have the ability to recognize and project gestures in 3D form and space.

It may be possible that the same types of cameras can be attached and used in conjunction with HMDs. Doing so may enable other usage models for gaming and environment specific contextually aware visual experiences such as "augmented reality" (which may refer to the interaction of virtual elements in a real environment) as well as "virtual reality" (which may refer to the injection of real elements inside a virtual reality).

In order for these solutions to be effective, they may be desired to perform at the highest level and they may be desired to have very low latency, allowing the user to perceive both the real and virtual world combined in one smooth and seamless experience.

Figure 1A:
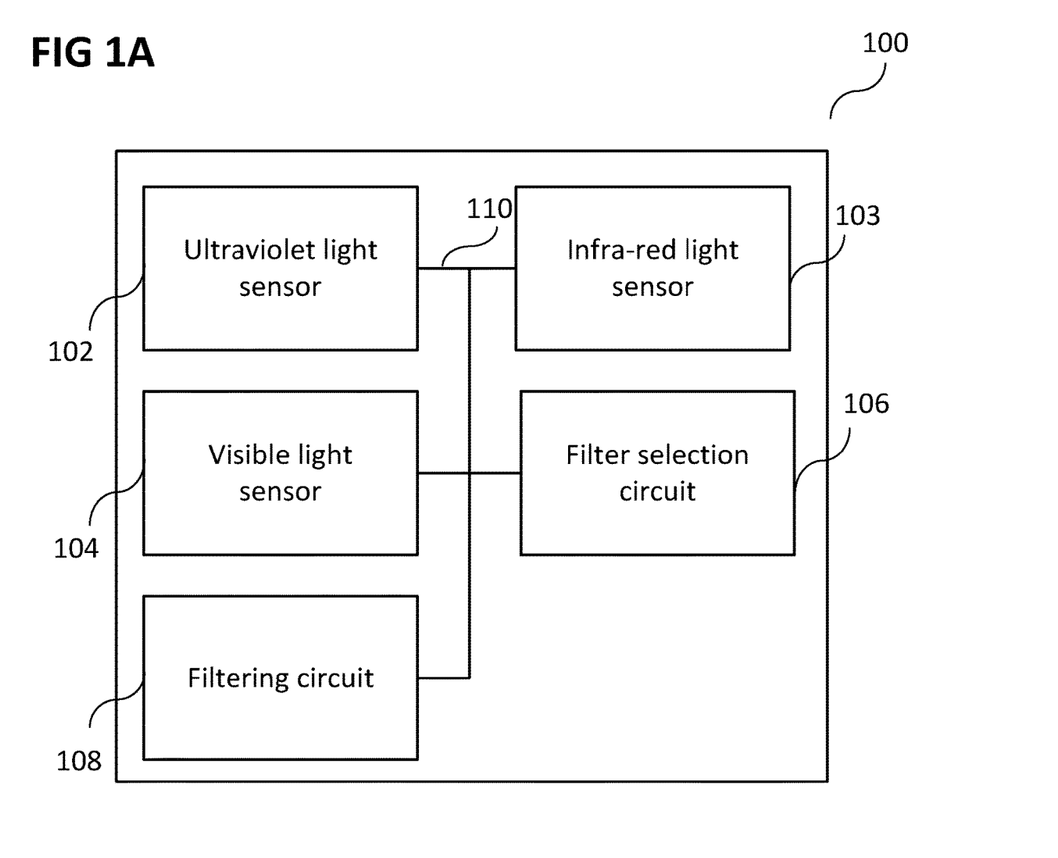
FIG. 1A and FIG. 1B show filtering devices according to various embodiments.

FIG. 1A shows a filtering device 100 according to various embodiments. The filtering device 100 may include an ultraviolet (UV) light sensor 102 configured to sense ultraviolet light. The filtering device 100 may further include an infra-red (IR) light sensor 103 configured to sense infra-red light. The filtering device 100 may further include a visible light sensor 104 configured to sense visible light. The filtering device 100 may further include a filter selection circuit 106 configured to select a filter based on at least two (for example two; for example all three) outputs selected from a list of outputs consisting of: an output of the ultraviolet light sensor 102; an output of the infra-red light sensor 103; and an output of the visible light sensor 104 (in other words: at least two of the outputs of the three sensors). The filtering device 100 may further include a filtering circuit 108 configured to apply the selected filter. The ultraviolet light sensor 102, infra-red light sensor 103, the visible light sensor 104, the filter selection circuit 106, and the filtering circuit 108 may be coupled with each other, like indicated by lines 110, for example electrically coupled, for example using a line or a cable, and/or mechanically coupled.

In other words, according to various embodiments, a filtering device may apply a filter, wherein the filtering device may select the filter from a plurality of filters based on measuring ultraviolet light and measuring visible light.

According to various embodiments, the ultraviolet light sensor 102 may be configured to sense light in a wavelength range of 10 nm to 400 nm. In other words, the ultraviolet sensor 102 may produce an output if light in a wavelength range of 10 nm to 400 nm (which may correspond to the wavelength of UV (ultraviolet) light) impinges on the ultraviolet sensor 102.

According to various embodiments, the ultraviolet light sensor 102 may be configured to not sense light outside a wavelength range of 10 nm to 400 nm. In other words, the ultraviolet sensor 102 may not produce an output if light outside a wavelength range of 10 nm to 400 nm impinges on the ultraviolet sensor 102.

According to various embodiments, the visible light sensor 104 may be configured to sense light in a wavelength range of 400 nm to 700 nm. In other words, the visible light sensor 104 may produce an output if light in a wavelength range of 400 nm to 700 nm (which may correspond to the wavelength range of visible light) impinges on the visible light sensor 102.

According to various embodiments, the visible light sensor 104 may be configured to not sense light outside a wavelength range of 400 nm to 700 nm. In other words, the visible light sensor 104 may not produce an output if light outside a wavelength range of 400 nm to 700 nm impinges on the visible light sensor 102.

According to various embodiments, the infra-red light sensor 103 may be configured to sense light beyond a wavelength range of 780 nm.

Figure 1B:
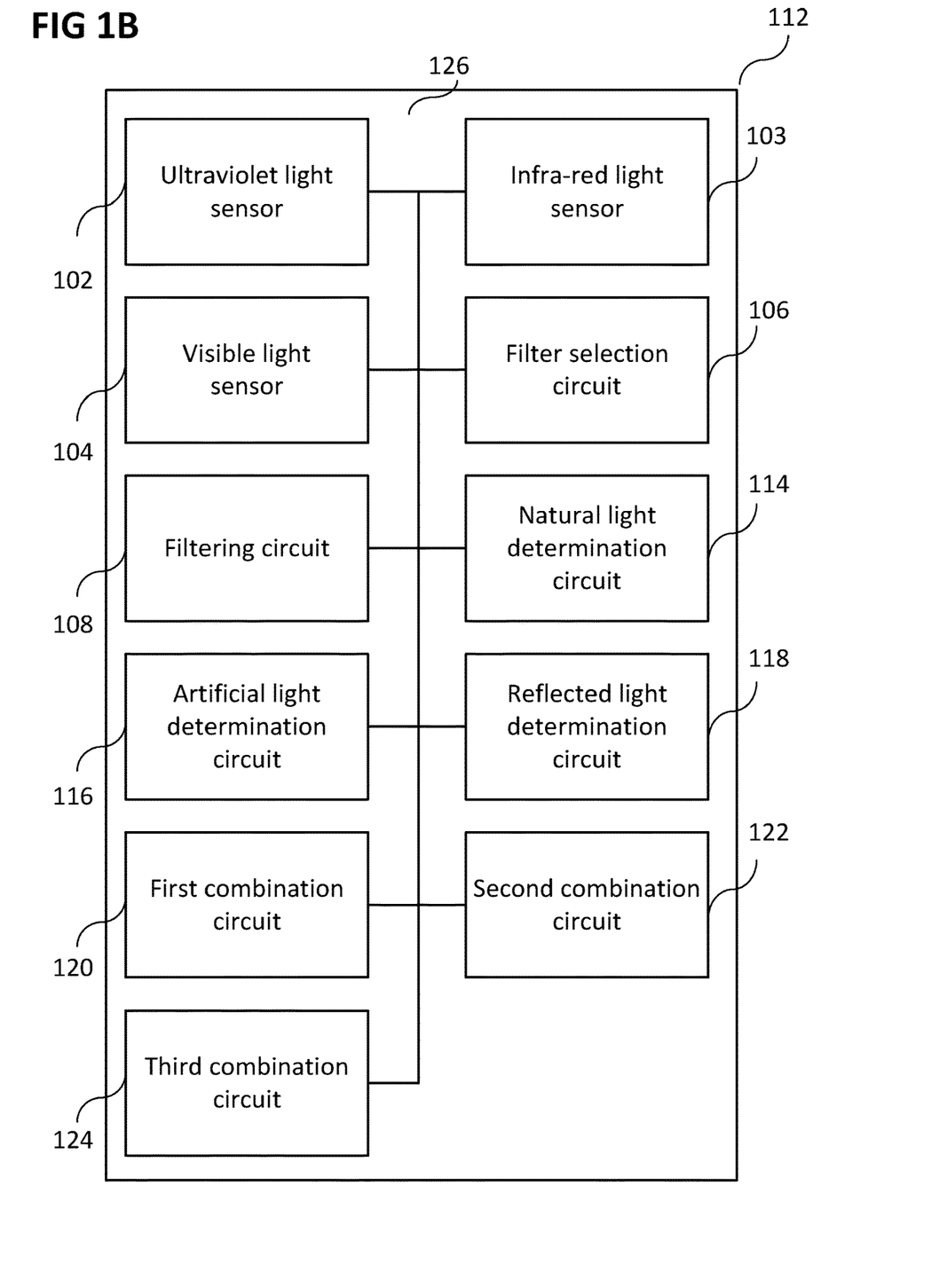

FIG. 1B shows a filtering device 112 according to various embodiments. The filtering device 112 may, similar to the filtering device 100 of FIG. 1A, include an ultraviolet light sensor 102 configured to sense ultraviolet light. The filtering device 112 may, similar to the filtering device 100 of FIG. 1A, further include an infra-red (IR) light sensor 103 configured to sense infra-red light. The filtering device 112 may, similar to the filtering device 100 of FIG. 1A, further include a visible light sensor 104 configured to sense visible light. The filtering device 112 may, similar to the filtering device 100 of FIG. 1A, further include a filter selection circuit 106 configured to select a filter based on at least two outputs selected from a list of outputs consisting of: an output of the ultraviolet light sensor 102; an output of the infra-red light sensor 103; and an output of the visible light sensor 104. The filtering device 112 may, similar to the filtering device 100 of FIG. 1A, further include a filtering circuit 108 configured to apply the selected filter. The filtering device 112 may further include a natural light determination circuit 114, like will be described in more detail below. The filtering device 112 may further include an artificial light determination circuit 116, like will be described in more detail below. The filtering device 112 may further include a reflected light determination circuit 118, like will be described in more detail below. The filtering device 112 may further include a first combination circuit 120, like will be described in more detail below. The filtering device 112 may further include a second combination circuit 122, like will be described in more detail below. The filtering device 112 may further include a third combination circuit 124, like will be described in more detail below. The ultraviolet light sensor 102, infra-red light sensor 103, the visible light sensor 104, the filter selection circuit 106, the filtering circuit 108, the natural light determination circuit 114, the artificial light determination circuit 116, the reflected light determination circuit 118, the first combination circuit 120, the second combination circuit 122, and the third combination circuit 124 may be coupled with each other, like indicated by lines 126, for example electrically coupled, for example using a line or a cable, and/or mechanically coupled.

According to various embodiments, the natural light determination circuit 114 may be configured to determine a portion of natural light in light received at the filtering device 112 based on at least one of the ultraviolet light sensor 102 or the visible light sensor 104 (or the respective outputs of these sensors 102 and 104).

According to various embodiments, the artificial light determination circuit 116 may be configured to determine a portion of artificial light in light received at the filtering device 112 based on at least one of the ultraviolet light sensor 102 or the visible light sensor 104 (or the respective outputs of these sensors 102 and 104).

According to various embodiments, the reflected light determination circuit 118 may be configured to determine a portion of reflected light in light received at the filtering device 112 based on at least one of the ultraviolet light sensor 102 or the visible light sensor 104 (or the respective outputs of these sensors 102 and 104).

According to various embodiments, the first combination circuit 120 may be configured to determine first combined information based on information indicating a portion of natural light in light received at the filtering device 112 and based on information indicating a portion of artificial light in the light received at the filtering device 112.

According to various embodiments, the filter selection circuit 106 may be configured to select the filter based on the first combined information.

According to various embodiments, the second combination circuit 122 may be configured to determine second combined information based on information indicating a portion of artificial light in light received at the filtering device 112 and based on information indicating a portion of reflected light in the light received at the filtering device 112.

According to various embodiments, the filter selection circuit 106 may be configured to select the filter based on the second combined information.

According to various embodiments, the third combination circuit 124 may be configured to determine third combined information based on the first combined information and based on the second combined information.

According to various embodiments, the filter selection circuit 106 may be configured to select the filter based on the third combined information.

According to various embodiments, the filtering device 112 may be configured to be provided in at least one of a head mounted display or a gesture recognition device.

Figure 1C:
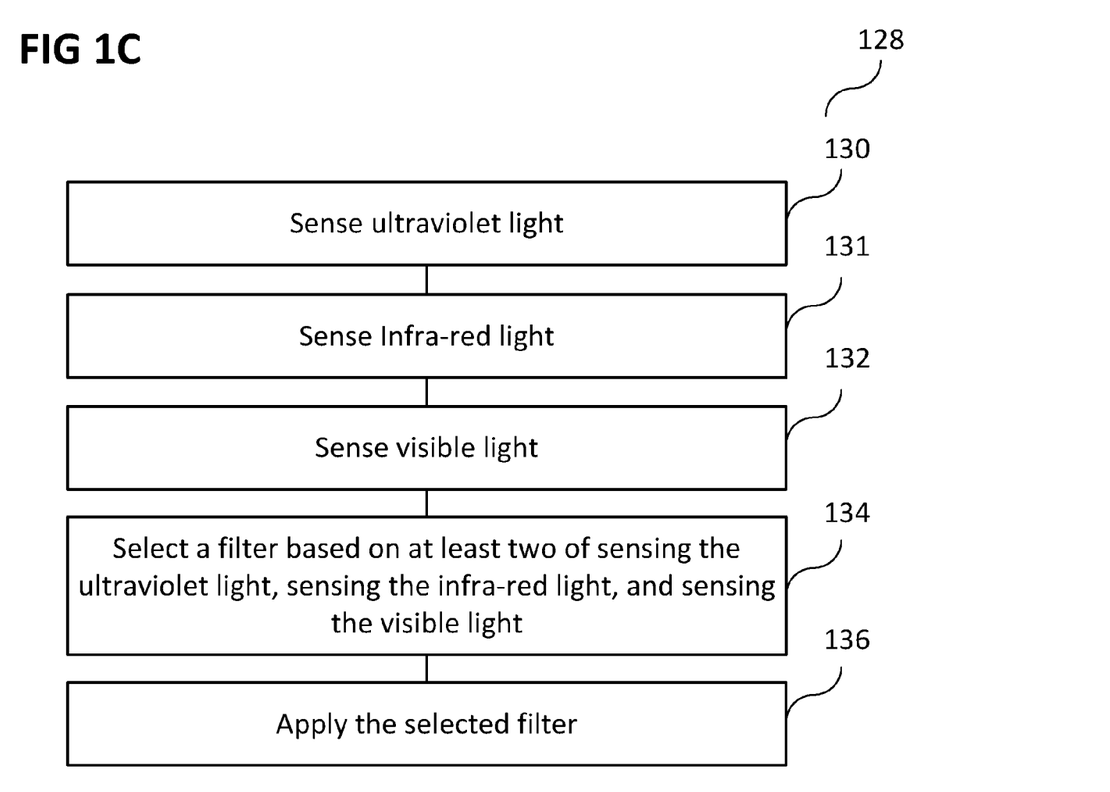
FIG. 1C shows a flow diagram illustrating a filtering method according to various embodiments.

FIG. 1C shows a flow diagram 128 illustrating a filtering method according to various embodiments. In 130, ultraviolet light may be sensed. In 131, infra-red light may be sensed. In 132, visible light may be sensed. In 134, a filter may be selected based on at least two sensings selected from a list of sensings consisting of: sensing the ultraviolet light; sensing the infra-red light; and sensing the visible light. In 136, the selected filter may be applied (for example to light received at a filtering device which performs the filtering method).

According to various embodiments, sensing the ultraviolet light may include or may be or may be included in sensing light in a wavelength range of 10 nm to 400 nm.

According to various embodiments, sensing the ultraviolet light may be free from sensing light outside a wavelength range of 10 nm to 400 nm.

According to various embodiments, sensing the visible light may include or may be or may be included in sensing light in a wavelength range of 400 nm to 700 nm.

According to various embodiments, sensing the visible light may be free from sensing light outside a wavelength range of 400 nm to 700 nm.

According to various embodiments, sensing the infra-red light comprises sensing light beyond a wavelength range of 780 nm.

According to various embodiments, the filtering method may further include determining a portion of natural light in light received based on at least one sensing the ultraviolet light or sensing the visible light.

According to various embodiments, the filtering method may further include determining a portion of artificial light in light received based on at least one of sensing the ultraviolet light or sensing the visible light.

According to various embodiments, the filtering method may further include determining a portion of reflected light in light received based on at least one of sensing the ultraviolet light or sensing the visible light.

According to various embodiments, the filtering method may further include determining first combined information based on information indicating a portion of natural light in light received and based on information indicating a portion of artificial light in the light received.

According to various embodiments, selecting the filter may include or may be or may be included in selecting the filter based on the first combined information.

According to various embodiments, the filtering method may further include determining second combined information based on information indicating a portion of artificial light in light received and based on information indicating a portion of reflected light in the light received.

According to various embodiments, selecting the filter may include or may be or may be included in selecting the filter based on the second combined information.

According to various embodiments, the filtering method may further include determining third combined information based on the first combined information and based on the second combined information.

According to various embodiments, selecting the filter may include or may be or may be included in selecting the filter based on the third combined information.

According to various embodiments, the filtering method may be performed in at least one of a head mounted display or a gesture recognition device.

According to various embodiments, a method, a device, or a system may be provided that integrates with a head mounted display (HMD) to minimizing latency and remove artifacts in the recognition of objects. The constant movements by the head while donning the HMD may create a situation where light sources are constantly changing. For example, a person wearing a Virtual Reality HMD may have a different perception of external light conditions. When the HMD is exposed to excessive light, in commonly used systems, this may cause the image sensors to re-adjust slowly, making the experience unnatural. According to various embodiments, this problem may be solved by coupling a light sensor and a UV sensor with the camera on the HMD to continuously adjust to different light conditions, such as when the head is constantly moving. The addition of the light sensor and UV sensor may enable the continuous switching of light profiles to ensure that images on the HMD screen do not suffer of artifacts and may reduce latency when exposed to excessive environmental light. For example, when wearing the HMD, the user may continuously move the head around the room or outside in the open. The image on screen may also integrate some elements of the real world (e.g. recognize only near objects like hands) but ignore all background information when in immersive mode. It is to be noted that the various embodiments are dynamic, and the light and UV sensors may provide more information on the structure and position of light sources.

According to various embodiments, devices and methods may use a light sensor (for example visible light sensor) and an UV (ultraviolet light) sensor, for example to enable dynamic filtering, for example to reduce the intense highly directional or very low light effects.

When a 2D/3D depth camera is attached to a HMD, one of the usage models that may be enabled according to various embodiments is the ability to view augmented and virtual reality based content. In both those scenarios, gesture recognition may be desired. Ambient (for example natural and/or artificial) light and the intensity of these light sources may be a key component to the camera performing correctly and optimally. If the environment is too intense, the camera may not be able to track and obtain a proper histogram of the user's forearms, hands and gestures.

According to various embodiments, by using a light sensor and a UV sensor, dynamic filtering may be applied in such a way as to reduce the intense light affects (for example over saturation, dark shadows, etc.), which may allow for better performance and may reduce the need for the camera to reacquire the histogram for hands, fingers and forearm and their change in positions.

The more often the camera has to try to reacquire and process a valid histogram, the higher the latency. The devices and methods according to various embodiments may be refined to allow for automatically switching light profiles to ensure that images or a video on the HMD do not suffer latency when exposed to environments with excessive or directionally intense light sources, for example as shown in FIG. 2A.

Figure 2A:
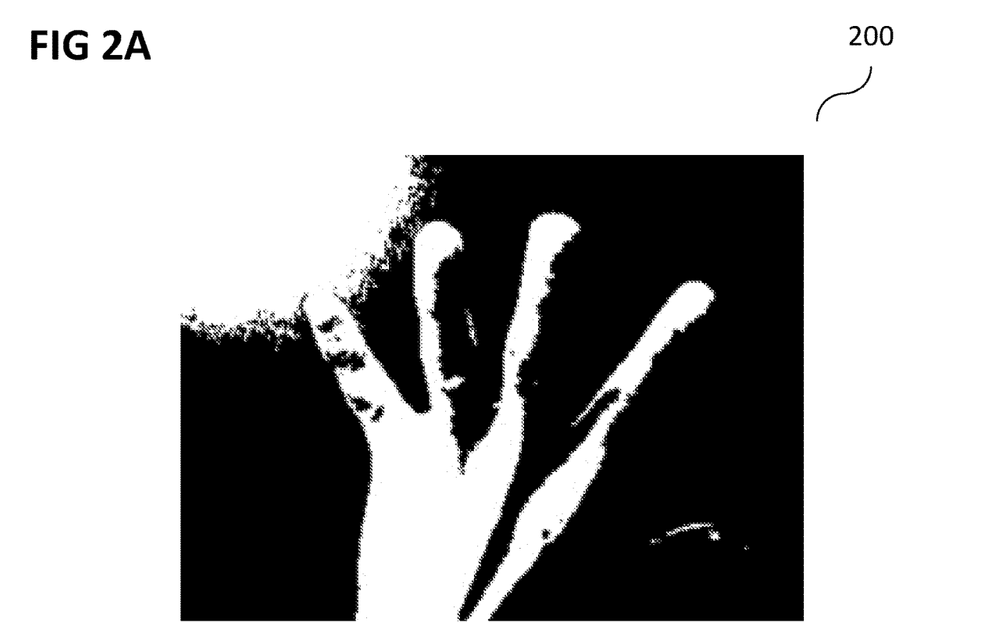
FIG. 2A shows an illustration of an image taken with an over-saturated histogram.
Figure 2B:
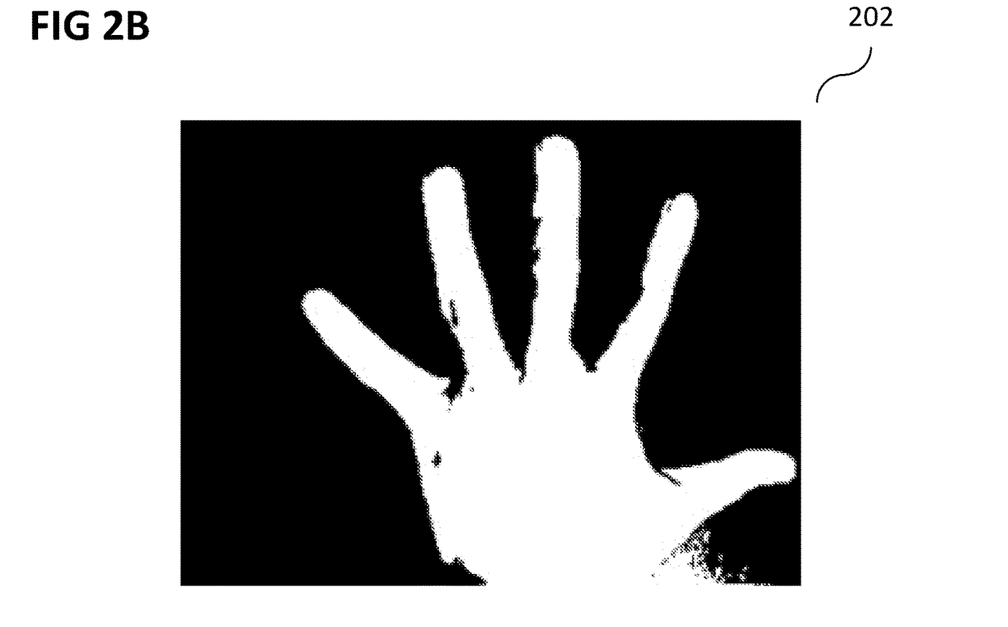
FIG. 2B shows an illustration of an image taken with a proper histogram.

FIG. 2A shows an illustration 200 of an image taken with an over-saturated histogram. FIG. 2B shows an illustration 202 of an image taken with a proper histogram.

Figure 3:
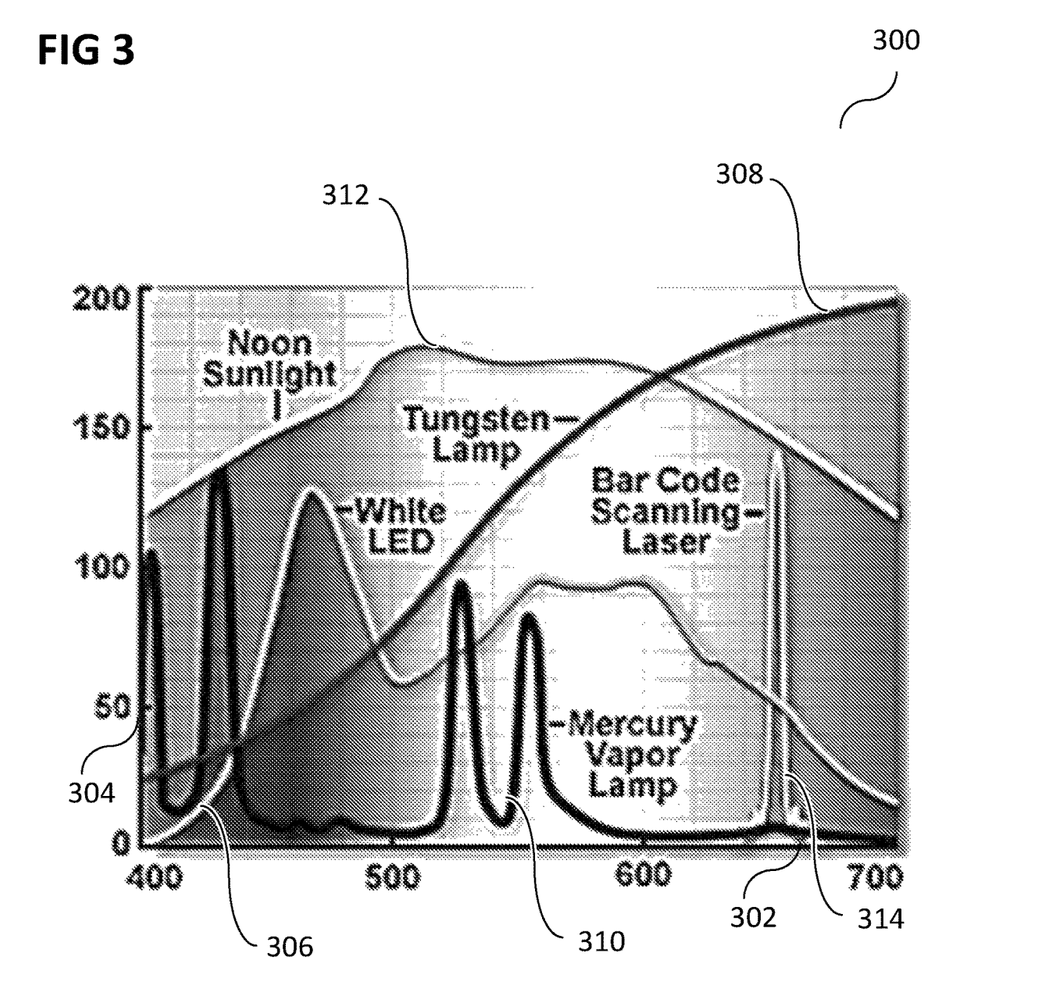
FIG. 3 shows a diagram illustrating spectra from common sources of visible light.

FIG. 3 shows a diagram 300 illustrating spectra from common sources of visible light. A horizontal axis 302 indicates wavelength in nanometers (nm), and a vertical axis 304 illustrates a relative energy. The spectra are illustrated for a white LED (306), for a tungsten lamp (308), for a mercury vapor lamps (310), for noon sunlight (312), and for a bar code scanning laser (314).

According to various embodiments, various methods and devices may use a combination of a light sensor and a UV sensor to automatically adjust for different lighting conditions when used with an HMD to improve performance and lower latency.

Various embodiments differ from current technologies as those usually require a "one-time" setup calibration. For example, various embodiments may provide a dynamic implementation, but only when the lighting conditions reach a predetermined level, as to not cause over-processing of the data acquisition.

Various embodiments may be implemented in various ways, for example a) a software implementation for processing of the data acquisitions where the host side handles the processing or b) a co-located co-processor resident on the HMD that handles the data acquisition processing. The latter may further reduce latency.

According to various embodiments, application of different filters approaches may consist of any (for example unique) combination of various levels (for example the following five levels) of dynamic filtering:

a) Filtering of intense direct/indirect "artificial" light and the core wave lengths of this type of light source.

b) Filtering of intense direct/indirect "natural" light and the core wave lengths of this type of light source.

c) Filtering of some combinational indirect intense light source, (i.e. natural, artificial and reflected light).

d) The application of selective UV filtering to further enhance color, contrast and/or to address over-saturation, hue of any one or a combination of the primary colors (i.e. R/G/B).

e) The combination for each camera's frames in alternate exposure settings such as in "High Dynamic Range" methods to cross left and right frame to reference and ignore over/under exposure for optimal capture. This last option may be particularly useful for Augmented Reality applications.

A high level example of a trigger event that would invoke one or a combination of the above defined filters may be "over saturation". This event and other events may occur once or repeatedly based on head movement and/or environmental changes. A user's view point may fall into or out of the event area and then back into the event area based on head movement as it changes. A positional sensor may detect the pattern or direction of movement (for example delta X, delta Y, and/or delta Z) and then the applicable light condition filter may be applied at the right time as the trigger event exceeds a set threshold.

The users' head position may change as they interact with the HMD and the virtual environment being displayed through it. This may bring into view various lighting conditions or light sources. These lighting condition or changes in light sources may be more or less intense to the extent that they may compromise the acquisition of a usable histogram (which may be understood to be a digital representation of captured light reflected off a target/surface or specific area). In the example detailed with in this disclosure the target/surface would be hands/s and/or finger/s, (for example like described with reference to FIGS. 2A and 2B). Intense or very low levels of visible light may result in an unusable histogram and in some cases higher latency hence resulting in the inability to perform robust gesture recognition. According to various embodiments, it is differentiated between IR/UV and visible light as visible light is what is used to determine the histogram referenced above. If there was a lighting condition where the intensity around ~400 nm and/or ~700 nm is very elevated, this could compromise the acquisition of the histogram. When there is a pure IR or UV light source, that aspect of the light sensor's function may be turned off to reduce processing overhead. In those situations where IR/UV light is of interest, the IR/UV portion or the light sensor may be activated and the processing of the IR/UV light may be provided.

This may help not only to identify a light source, but also to track its relative position in space and time and dynamically re-adjust the filter to keep a known good state or histogram.

For example, a given fixed light source may become more or less intense as the user gets closer or further away from it. Furthermore, as the light intensity increases or decreases, there may be a non-linear change in intensity (for example like shown in the LED based chart of FIG. 4). The light sensors may also detect the level shift in red or blue light which may indicate an increase or decrease in distance from the source. Additionally, the specific camera/sensor preset light sensitivity threshold may be used as a baseline for the application of a given filter or set of filters as the intensity of light changes.

Figure 4:
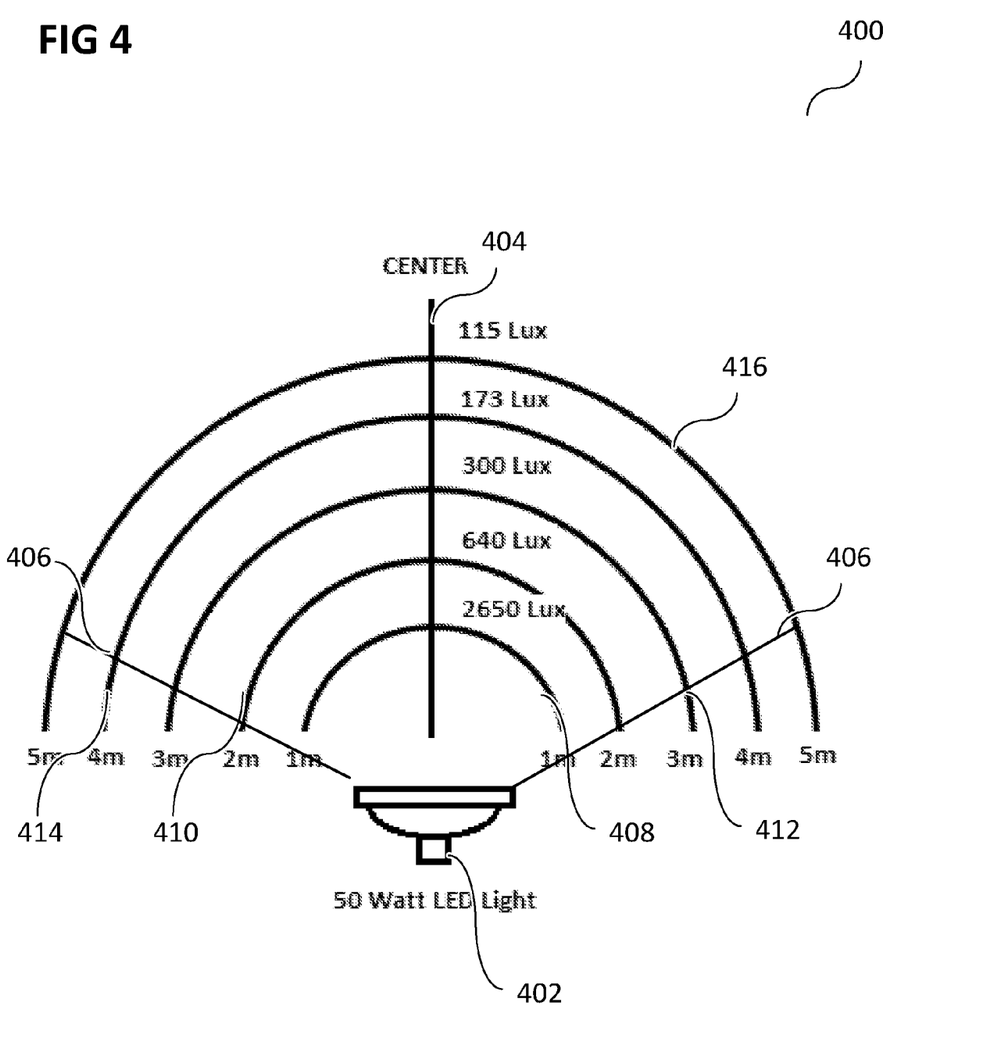
FIG. 4 shows an illustration of a light and a corresponding Lux scale by distance.

FIG. 4 shows an illustration 400 of a light (for example an LED (light emitting diode) based light) and a corresponding Lux scale (in other words: a light Lux scale) by distance. For example, a light source 402 (for example a 50 Watt LED light 402) is shown, arranged to have its symmetry axis 404 pointing upwards in the illustration. An area of illumination of the light source 402 is illustrated by lines 406. For different distances from the light 402, the brightness in Lux is shown. For example, in a distance of 1 m (as shown by circle 408), a light of 2650 Lux may be present. For example, in a distance of 2 m (as shown by circle 410), a light of 640 Lux may be present. For example, in a distance of 3 m (as shown by circle 412), a light of 300 Lux may be present. For example, in a distance of 4 m (as shown by circle 414), a light of 173 Lux may be present. For example, in a distance of 5 m (as shown by circle 416), a light of 115 Lux may be present.

Figure 5:
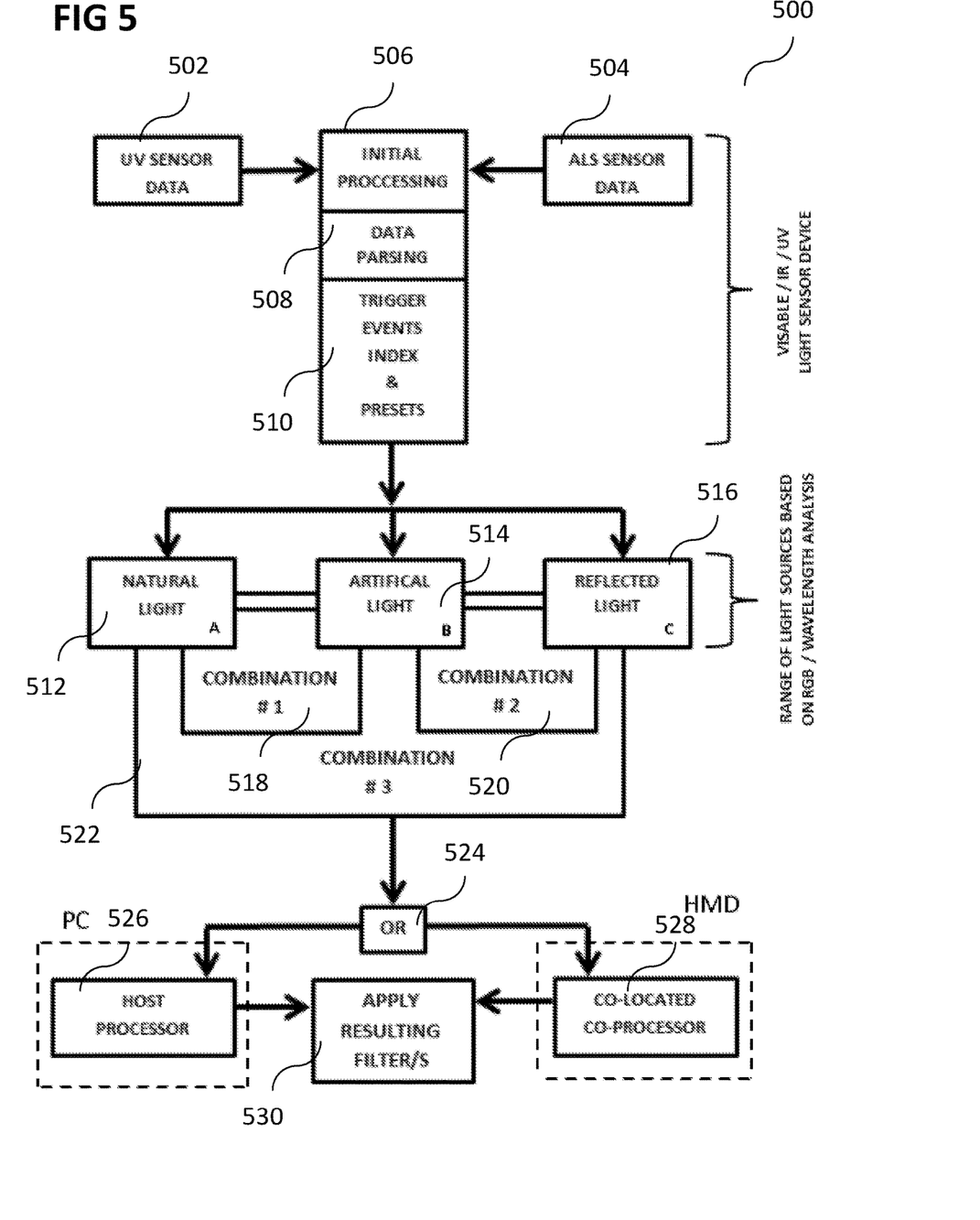
FIG. 5 shows a flow diagram illustrating an application of light filter profiles according to various embodiments.

FIG. 5 shows a flow diagram 500 illustrating an application of light filter profiles. In other words, FIG. 5 illustrates a process flow of an application of light filter profiles. UV sensor data 502 and ALS ("ambient light source" or "visible light") sensor data 504 may be provided for initial processing 506, data parsing 508, and triggering of events index and presets 510. The output of processing 506, 508, and 510 may be provided in three separate portions as natural light 512, artificial light 514, and reflected light 516. A first combination 518 may combine the natural light 512 and artificial light 514. A second combination 520 may combine the artificial light 514 and the reflected light 516. A third combination 522 may combine the result of the first combination 518 and the second combination 520. The output of the third combination 522 may be provided to an OR block 524. It will be understood that the OR block 524 is a reference to an alternative signal flow which may be hard wired into the light sensor logic. According to various embodiments, a HMD or gesture recognition device may be provided with a light sensor device/circuit which is directly connected with the processing done on host PC/computer "OR" with the light sensor device/circuit co-located within the HMD itself, wherein processing may be done within the HMD and then the results would be passed on to the host/PC pre-processed. Additional processing/further filter refinements may be applied on the host if and as required.

The output of the "OR" 524 block may be provided to a host processor 526 or to a co-located co-processor 528 on the HMD. The output of the host processor 526 or the output of the co-located co-processor 528 on the HMD may be provided to applying the resulting filters 530.

Like illustrated in FIG. 5, the top portion of FIG. 5 relates to visible/IR/UV light sensor devices, and the middle portion of FIG. 5 relates to a range of light sources based on RGB/wavelength analysis. It will be understood that the letters next to the range of light sources 512, 514, 516 are provided so as to make it easier to identify the type of light being detected, for example natural light is equated with letter "A", artificial light is equated with letter "B", and reflected light is equated with letter "C".

Devices and methods according to various embodiments may improve performance of a gesture recognition and/or HMD system and may lower latency to levels that may allow for a wider range of usage models including interacting with real time display and viewing of augmented and virtual reality content.

According to various embodiments, dynamic switching of light filter profiles for gesture recognition on a HMD may be provided.

FIG. 2A illustrates a specific and very likely adverse lighting condition scenario that may occur during gesture recognition. The figure shows an intense, highly directional light source which is negatively affecting the sensors ability to acquire a usable histogram of the hand and/or fingers. It shows a washed out area in the top left hand corner and an occlusion of the thumb in the lower right hand corner which may be also caused by the same intense, highly directional light source in the upper left hand corner. In this example, the light sensor may apply a more restrictive filter. An "attention factor" may be applied allowing less light in so as to not over saturate the sensor. Another example that can be inferred from FIG. 2A is the opposite lighting condition where by the light source is very low; this may tend to not illuminate the hand and fingers so a filter would be applied that would allow more light in, specifically "gain factor" may be applied until a recognizable/usable histogram could be detected.

According to various embodiments, dynamic light source filtering, light source filtering, dynamic light source filtering profiles, adaptive light source filtering, adaptive light source profiles, HMD light filtering, and/or gesture recognition light filtering may be provided.

The following examples pertain to further embodiments.

Example 1 is a filtering device comprising: an ultraviolet light sensor configured to sense ultraviolet light; an infra-red light sensor configured to sense infra-red light; a visible light sensor configured to sense visible light; a filter selection circuit configured to select a filter based on at least two outputs selected from a list of outputs consisting of: an output of the ultraviolet light sensor; an output of the infra-red light sensor; and an output of the visible light sensor; and a filtering circuit configured to apply the selected filter.

In example 2, the subject-matter of example 1 can optionally include that the ultraviolet light sensor is configured to sense light in a wavelength range of 10 nm to 400 nm.

In example 3, the subject-matter of any one of examples 1 to 2 can optionally include that the ultraviolet light sensor is configured to not sense light outside a wavelength range of 10 nm to 400 nm.

In example 4, the subject-matter of any one of examples 1 to 3 can optionally include that the visible light sensor is configured to sense light in a wavelength range of 400 nm to 700 nm.

In example 5, the subject-matter of any one of examples 1 to 4 can optionally include that the visible light sensor is configured to not sense light outside a wavelength range of 400 nm to 700 nm.

In example 6, the subject-matter of any one of examples 1 to 5 can optionally include that the infra-red light sensor is configured to sense light beyond a wavelength range of 780 nm.

In example 7, the subject-matter of any one of examples 1 to 6 can optionally include a natural light determination circuit configured to determine a portion of natural light in light received at the filtering device based on at least one of the ultraviolet light sensor or the visible light sensor.

In example 8, the subject-matter of any one of examples 1 to 7 can optionally include an artificial light determination circuit configured to determine a portion of artificial light in light received at the filtering device based on at least one of the ultraviolet light sensor or the visible light sensor.

In example 9, the subject-matter of any one of examples 1 to 8 can optionally include a reflected light determination circuit configured to determine a portion of reflected light in light received at the filtering device based on at least one of the ultraviolet light sensor or the visible light sensor.

In example 10, the subject-matter of any one of examples 1 to 9 can optionally include a first combination circuit configured to determine first combined information based on information indicating a portion of natural light in light received at the filtering device and based on information indicating a portion of artificial light in the light received at the filtering device.

In example 11, the subject-matter of example 10 can optionally include that the filter selection circuit is configured to select the filter based on the first combined information.

In example 12, the subject-matter of any one of examples 1 to 11 can optionally include a second combination circuit configured to determine second combined information based on information indicating a portion of artificial light in light received at the filtering device and based on information indicating a portion of reflected light in the light received at the filtering device.

In example 13, the subject-matter of example 12 can optionally include that the filter selection circuit is configured to select the filter based on the second combined information.

In example 14, the subject-matter of any one of examples 1 to 13 can optionally include a first combination circuit configured to determine first combined information based on information indicating a portion of natural light in light received at the filtering device and based on information indicating a portion of artificial light in the light received at the filtering device; a second combination circuit configured to determine second combined information based on information indicating a portion of artificial light in light received at the filtering device and based on information indicating a portion of reflected light in the light received at the filtering device; and a third combination circuit configured to determine third combined information based on the first combined information and based on the second combined information.

In example 15, the subject-matter of examples 14 can optionally include that the filter selection circuit is configured to select the filter based on the third combined information.

In example 16, the subject-matter of any one of examples 1 to 15 can optionally include that the filtering device is configured to be provided in at least one of a head mounted display or a gesture recognition device.

Example 17 is a filtering method comprising: sensing ultraviolet light; sensing infra-red light; sensing visible light; selecting a filter based on at least two sensings selected from a list of sensings consisting of: sensing the ultraviolet light; sensing the infra-red light; and sensing the visible light; and applying the selected filter.

In example 18, the subject-matter of example 17 can optionally include that sensing the ultraviolet light comprises sensing light in a wavelength range of 10 nm to 400 nm.

In example 19, the subject-matter of any one of examples 17 to 18 can optionally include that sensing the ultraviolet light is free from sensing light outside a wavelength range of 10 nm to 400 nm.

In example 20, the subject-matter of any one of examples 17 to 19 can optionally include that sensing the visible light comprises sensing light in a wavelength range of 400 nm to 700 nm.

In example 21, the subject-matter of any one of examples 17 to 20 can optionally include that sensing the visible light is free from sensing light outside a wavelength range of 400 nm to 700 nm.

In example 22, the subject-matter of any one of examples 17 to 21 can optionally include that sensing the infra-red light comprises sensing light beyond a wavelength range of 780 nm.

In example 23, the subject-matter of any one of examples 17 to 22 can optionally include determining a portion of natural light in light received based on at least one sensing the ultraviolet light or sensing the visible light.

In example 24, the subject-matter of any one of examples 17 to 23 can optionally include determining a portion of artificial light in light received based on at least one of sensing the ultraviolet light or sensing the visible light.

In example 25, the subject-matter of any one of examples 17 to 24 can optionally include determining a portion of reflected light in light received based on at least one of sensing the ultraviolet light or sensing the visible light.

In example 26, the subject-matter of any one of examples 17 to 25 can optionally include determining first combined information based on information indicating a portion of natural light in light received and based on information indicating a portion of artificial light in the light received.

In example 27, the subject-matter of example 26 can optionally include that selecting the filter comprises selecting the filter based on the first combined information.

In example 28, the subject-matter of any one of examples 17 to 27 can optionally include determining second combined information based on information indicating a portion of artificial light in light received and based on information indicating a portion of reflected light in the light received.

In example 29, the subject-matter of example 28 can optionally include that selecting the filter comprises selecting the filter based on the second combined information.

In example 30, the subject-matter of any one of examples 17 to 29 can optionally include: determining first combined information based on information indicating a portion of natural light in light received and based on information indicating a portion of artificial light in the light received; determining second combined information based on information indicating a portion of artificial light in light received and based on information indicating a portion of reflected light in the light received; and determining third combined information based on the first combined information and based on the second combined information.

In example 31, the subject-matter of example 30 can optionally include that selecting the filter comprises selecting the filter based on the third combined information.

In example 32, the subject-matter of any one of examples 17 to 31 can optionally include that the filtering method is performed in at least one of a head mounted display or a gesture recognition device.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A filtering device coupled to a camera, the filtering device comprising:
   an ultraviolet light sensor configured to sense ultraviolet light;
   an infra-red light sensor configured to sense infra-red light;
   a visible light sensor configured to sense visible light;
   at least one of a natural light determination circuit, an artificial light determination circuit, or a reflected light determination circuit, wherein the natural light determination circuit is configured to determine a portion of natural light in light received at the camera based on at least one of the ultraviolet light sensor or the visible light sensor, wherein the artificial light determination circuit is configured to determine a portion of artificial light in the light received at the camera based on at least one of the ultraviolet light sensor or the visible light sensor, wherein the reflected light determination circuit is configured to determine a portion of reflected light in the light received at the camera based on at least one of the ultraviolet light sensor or the visible light sensor;
   a filter selection circuit configured to select a filter based on at least two outputs selected from a list of outputs consisting of: an output of the ultraviolet light sensor; an output of the infra-red light sensor; and an output of the visible light sensor, wherein the filter selection circuit is configured to select the filter based on at least one of the determined portion of natural light, the determined portion of artificial light, or the determined portion of reflected light; and
   a filtering circuit configured to apply the selected filter to the light received at the camera to enhance images captured by the camera.

2. The filtering device of claim 1, further comprising:
   a first combination circuit configured to determine a first combined information based on information indicating the portion of natural light in the light received at the camera and based on information indicating the portion of artificial light in the light received at the camera.

3. The filtering device of claim 2,
   wherein the filter selection circuit is configured to select the filter based on the first combined information.

4. The filtering device of claim 2, further comprising:
   a second combination circuit configured to determine a second combined information based on the information indicating the portion of artificial light in the light received at the camera and based on information indicating the portion of reflected light in the light received at the camera.

5. The filtering device of claim 4,
   wherein the filter selection circuit is configured to select the filter based on the second combined information.

6. The filtering device of claim 1, further comprising:
   a first combination circuit configured to determine a first combined information based on information indicating the portion of natural light in the light received at the camera and based on information indicating the portion of artificial light in the light received at the camera;
   a second combination circuit configured to determine a second combined information based on the information indicating the portion of artificial light in the light received at the camera and based on information indicating the portion of reflected light in the light received at the camera; and
   a third combination circuit configured to determine a third combined information based on the first combined information and based on the second combined information.

7. The filtering device of claim 1,
   wherein the filtering device is configured to be provided in at least one of a head mounted display or a gesture recognition device.

8. A filtering method comprising:
   sensing ultraviolet light received at a camera;
   sensing infra-red light received at the camera;
   sensing visible light received at the camera;
   performing at least one of:
      determining a portion of natural light in light received at the camera based on at least one of the sensed ultraviolet light or the sensed visible light;
      determining a portion of artificial light in the light received at the camera based on at least one of the sensed ultraviolet light or the sensed visible light; or
      determining a portion of reflected light in the light received at the camera based on at least one of the sensed ultraviolet light or the sensed visible light;
   selecting a filter based on at least two of: the sensed ultraviolet light; the sensed infra-red light; and the sensed visible light, wherein the filter is selected based on at least one of the determined portion of natural light, the determined portion of artificial light, or the determined portion of reflected light; and
   applying the selected filter to the light received at the camera to enhance images captured by the camera.

9. The filtering method of claim 8, further comprising:
   determining a first combined information based on information indicating the portion of natural light in the light received at the camera and based on information indicating the portion of artificial light in the light received at the camera.

10. The filtering method of claim 9,
    wherein selecting the filter comprises selecting the filter based on the first combined information.

11. The filtering method of claim 9, further comprising:
    determining a second combined information based on the information indicating the portion of artificial light in the light received at the camera and based on information indicating the portion of reflected light in the light received at the camera.

12. The filtering method of claim 11,
    wherein selecting the filter comprises selecting the filter based on the second combined information.

13. The filtering method of claim 8, further comprising:
    determining a first combined information based on information indicating the portion of natural light in the light received at the camera and based on information indicating the portion of artificial light in the light received at the camera;
    determining a second combined information based on the information indicating the portion of artificial light in the light received at the camera and based on information indicating the portion of reflected light in the light received at the camera; and
    determining a third combined information based on the first combined information and based on the second combined information.

14. The filtering method of claim 8,
    wherein the filtering method is performed in at least one of a head mounted display or a gesture recognition device.

* * * * *